United States Patent
Ishihara et al.

(10) Patent No.: US 9,383,438 B2
(45) Date of Patent: Jul. 5, 2016

(54) PRESENCE DETECTION SYSTEM, PRESENCE DETECTION METHOD, AND PROGRAM

(75) Inventors: Masahiro Ishihara, Tokyo (JP); Yoshiaki Koizumi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 302 days.

(21) Appl. No.: 14/009,343

(22) PCT Filed: Apr. 4, 2011

(86) PCT No.: PCT/JP2011/058528
§ 371 (c)(1),
(2), (4) Date: Oct. 2, 2013

(87) PCT Pub. No.: WO2012/137285
PCT Pub. Date: Oct. 11, 2012

(65) Prior Publication Data
US 2014/0015706 A1   Jan. 16, 2014

(51) Int. Cl.
*G01S 13/04* (2006.01)
*G01S 13/00* (2006.01)
*G08B 21/22* (2006.01)
*G01V 8/20* (2006.01)

(52) U.S. Cl.
CPC .............. *G01S 13/04* (2013.01); *G01S 13/003* (2013.01); *G08B 21/22* (2013.01); *G01V 8/20* (2013.01)

(58) Field of Classification Search
CPC ........ G01S 13/04; G01S 13/003; G08B 21/22
USPC ..................................... 342/27, 28
See application file for complete search history.

(56) References Cited

U.S. PATENT DOCUMENTS

| | | | | |
|---|---|---|---|---|
| 4,016,529 A | * | 4/1977 | Inuzuka | G01V 3/12 342/27 |
| 5,760,687 A | * | 6/1998 | Cousy | G01S 13/56 340/554 |

(Continued)

FOREIGN PATENT DOCUMENTS

| | | |
|---|---|---|
| JP | S63-181587 A | 7/1988 |
| JP | 06-103471 A | 4/1994 |

(Continued)

OTHER PUBLICATIONS

Office Action mailed Aug. 19, 2014 issued in corresponding JP patent application No. 2013-508647 (and English translation).

(Continued)

*Primary Examiner* — Peter Bythrow
(74) *Attorney, Agent, or Firm* — Posz Law Group, PLC

(57) ABSTRACT

A presence detection system is equipped with a transmitter that transmits a multipath wireless signal and a receiver that detects the presence of a person by receiving the transmitted wireless signal, within a prescribed space. On the basis of the reception level for a wireless signal received intermittently at the beginning of a first interval, the receiver determines whether there has been a change in the present/absent state of a person. When it is determined that there has been a change in the present/absent state of a person, the receiver determines whether a person is present/absent on the basis of variation in the reception level for a wireless signal received at the beginning of a second interval, which is shorter than the first interval.

12 Claims, 5 Drawing Sheets

(56) References Cited

U.S. PATENT DOCUMENTS

| | | | | |
|---|---|---|---|---|
| 5,969,595 | A * | 10/1999 | Schipper | B60R 25/102 340/426.19 |
| 6,239,736 | B1 * | 5/2001 | McDonald | G01S 7/2922 340/554 |
| 6,281,797 | B1 * | 8/2001 | Forster | G01S 5/0018 340/438 |
| 6,437,702 | B1 * | 8/2002 | Ragland | G01S 7/003 340/425.5 |
| 7,019,683 | B2 * | 3/2006 | Stevens | G01S 13/56 342/134 |
| 7,026,924 | B2 * | 4/2006 | Degrauwe | G06K 7/0008 340/523 |
| 7,088,236 | B2 * | 8/2006 | Sorensen | G01V 3/12 340/539.13 |
| 7,295,109 | B2 * | 11/2007 | Kobayashi | G08B 13/1966 340/539.21 |
| 8,525,725 | B2 * | 9/2013 | Libby | G01S 5/02 342/118 |
| 8,816,895 | B2 * | 8/2014 | Young | G01S 7/412 342/118 |
| 2003/0210139 | A1 * | 11/2003 | Brooks | B64F 1/368 340/531 |
| 2005/0055568 | A1 * | 3/2005 | Agrawala | G07C 9/00111 726/2 |
| 2005/0195101 | A1 * | 9/2005 | Stevens | G01S 13/56 342/28 |
| 2005/0285737 | A1 * | 12/2005 | Kobayashi | G08B 13/1966 340/552 |
| 2010/0026479 | A1 * | 2/2010 | Tran | A61B 5/0006 340/501 |
| 2011/0240750 | A1 * | 10/2011 | Tokura | G01S 13/56 236/51 |

FOREIGN PATENT DOCUMENTS

| | | |
|---|---|---|
| JP | 08-079840 A | 3/1996 |
| JP | 08-263759 A | 10/1996 |
| JP | 08-338879 A | 12/1996 |
| JP | 10-020925 A | 1/1998 |
| JP | 2001-229474 A | 8/2001 |
| JP | 2003-230174 A | 8/2003 |
| JP | 2006-221213 A | 8/2006 |

OTHER PUBLICATIONS

Office Action mailed May 7, 2015 in the corresponding JP application 2013-508647 (and partial English translation).

Pius W.Q. Lee et al. "Wireless Sensing Without Sensors—An Experimental Approach" IEEE 20th International Symposium on Personal, Indoor and Mobile Radio Communications, IEEE, Piscataway, NJ. Sep. 13, 2009.

European Extended Search Report (EESR) mailed on Aug. 19, 2014 in corresponding EP Application No. 11863171.2.

International Search Report of the International Searching Authority mailed Jun. 7, 2011 for the corresponding international application No. PCT/JP2011/058528 (and English translation).

Office Action dated Jan. 19, 2015 issued in corresponding CN patent application No. 201180069819.8 (and partial English translation).

* cited by examiner

PRESENCE DETECTION SYSTEM, PRESENCE DETECTION METHOD, AND PROGRAM

CROSS REFERENCE TO RELATED APPLICATION

This application is a U.S. national stage application of International Application No. PCT/JP2011/058528 filed on Apr. 4, 2011.

TECHNICAL FIELD

The present invention relates to a presence detection system, presence detection method and program for detecting whether or not a person is present within a prescribed space.

BACKGROUND ART

In the past, as a system for detecting whether or not a person is inside (is present or is not present in) a building or a specific room therein (a presence detection), a system has been proposed that detects the presence/absence of a person by directly irradiating a person with microwaves having a high linearity, such as 10.5 GHz and/or the like, and receiving reflected waves. However, when the attempt is made to use microwaves, specialized transmission equipment and receiving equipment is necessary, so the system as a whole has a high cost. In addition, with this method the presence/absence of a person is detected using the linearity of microwaves, so the detection range is limited to the direction in which the equipment emits the microwaves. Consequently, this system is not suitable to applications such as presence detection in a room as a whole.

In addition, a system has also been proposed that detects the movement of a substance whose temperature differs from the surroundings using an infrared sensor. This system could easily be composed by simply providing an infrared receiver. However, this system uses weak infrared rays generated from humans and thus is not suitable for applications such as presence detection in a room as a whole due to sensitivity issues.

As a system for detecting the presence of a person simply yet in a wide area, a human movement detection system has been proposed that uses as a transmission source radio waves transmitted from a wireless system accomplishing services at a constant transmission power such as TV broadcast waves and/or the like (for example, see Patent Literature 1). This system detects the presence of a person by constantly detecting the range of fluctuations in radio wave reception levels using the principle that the reception level of radio waves fluctuates in accordance with changes in the multipath environment in a room due to a person's movements.

With this person behavior detection system, it is possible to realize a simple presence detection system that does not require special hardware and that uses wireless communication equipment set up in a room for other objectives.

In addition, with this system, presence detection is possible in the entirety of an expansive room because reflected waves that propagate throughout the room as a whole are used, not only radio waves transmitted directly to the receiver from the transmitter.

CITATION LIST

Patent Literature

Patent Literature 1: Unexamined Japanese Patent Application Kokai Publication No. 2006-221213.

SUMMARY OF INVENTION

Technical Problem

It is desirable for the transmission function and reception function in the presence detection system to be built into a remote control of home appliance equipment as well as battery-powered equipment such as sensor equipment. This is because if such functions are built into the remote control of home appliance equipment, control of home appliance equipment based on presence detection information becomes easy.

However, with the presence detection system of the above-described Patent Literature 1, it is necessary to constantly detect a fluctuation range of the reception level. Consequently, it is necessary for the receiver to be constantly in a receiving state, so power consumption increases. The greater power consumption becomes, the shorter the life of the battery powering the equipment becomes.

In consideration of the foregoing, it is an objective of the present invention to provide a presence detection system, a presence detection method and a program with which it is possible to detect the presence of a person easily and over a wide area while reducing power consumption.

Solution to Problem

To achieve the above objective, the presence detection system according to the present invention comprises a transmitter that transmits multipath wireless signals and a receiver that detects the presence of a person by receiving the transmitted wireless signals, within a prescribed space. In the receiver a first determiner determines whether or not there has been a change in the present/absent state of a person on the basis of the reception level of the wireless signals received intermittently at the beginning of a first interval. A second determiner determines the presence/absence of a person on the basis of variance in the reception level of the wireless signals received at the beginning of a second interval shorter than the first interval, when it is determined by the first determiner that the reception level of the wireless signals has changed.

Advantageous Effects of Invention

With this invention, when receiving multipath wireless signals at the beginning of a first interval that is a long interval, and only when detecting a change in that reception level, continuous reception of presence detection signals is accomplished by shortening the interval for receiving the wireless signals. Through this, it becomes unnecessary to constantly receive wireless signals, so it becomes possible to detect the presence of a person simply and over a wide area while reducing power consumption.

DESCRIPTION OF EMBODIMENTS

Embodiments of the present invention are described in detail below with reference to the drawings;

Embodiment 1

First, Embodiment 1 of the present invention is described.

Figure 1:
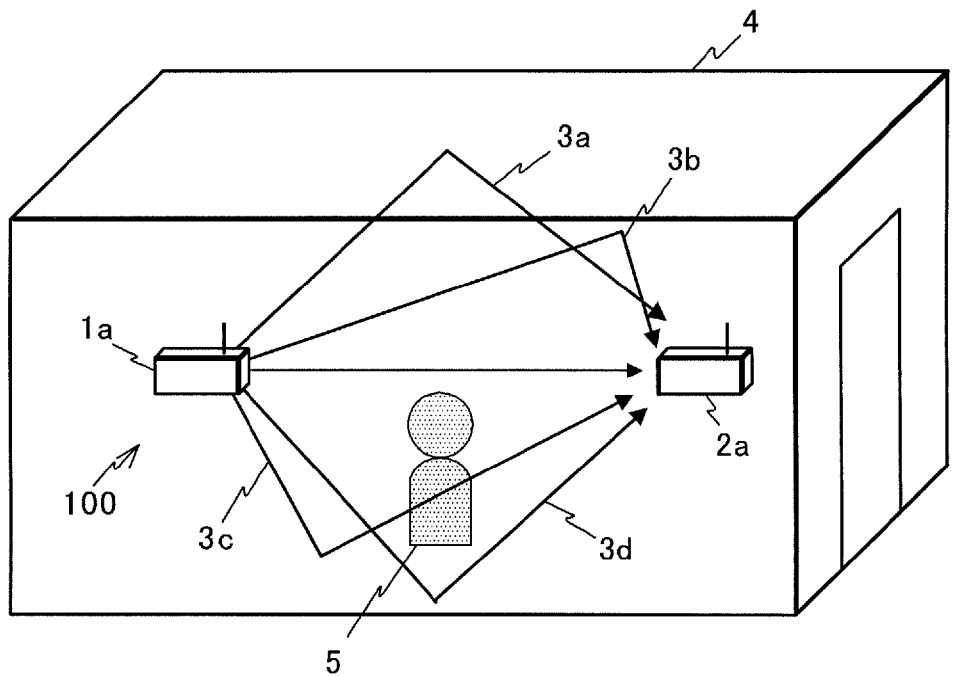
FIG. 1 is a schematic drawing showing a summary composition of a presence detection system according to Embodiment 1 of the present invention.

FIG. 1 shows the composition of a presence detection system 100 according to Embodiment 1 of the present invention. As shown in FIG. 1, the presence detection system 100 comprises a transmitter 1a and a receiver 2a. The transmitter 1a transmits presence detection signals that are multipath wireless signals. The receiver 2a receives the transmitted presence detection signals and detects the presence of a person. The transmitter 1a and the receiver 2a are both provided within a presence detection area 4 as a prescribed space.

The transmitter 1a is, for example, a wireless LAN (Local Area Network) base station or home controller and/or the like, and periodically transmits a beacon signal. The transmitter 1a is useable as long as the device periodically transmits radio waves with a constant transmission output. For example, it would be fine to receive television or radio broadcast waves and transfer such within the presence detection area 4.

The presence detection area 4 in which the transmitter 1a and the receiver 2a are positioned is a prescribed space within a range where a person 5 enters and exits and where presence detection of the person 5 is accomplished. The presence detection area 4 may for example be a single room or may be multiple rooms.

Radio waves transmitted from the transmitter 1a are repeatedly reflected, transmitted and refracted by the walls, ceiling and floor within the presence detection area 4 or furniture positioned inside the presence detection area 4, and for example reach the receiver 2a as multipath wireless signals after passing through propagation paths 3a, 3b, 3c, 3d and so forth.

Figure 2:
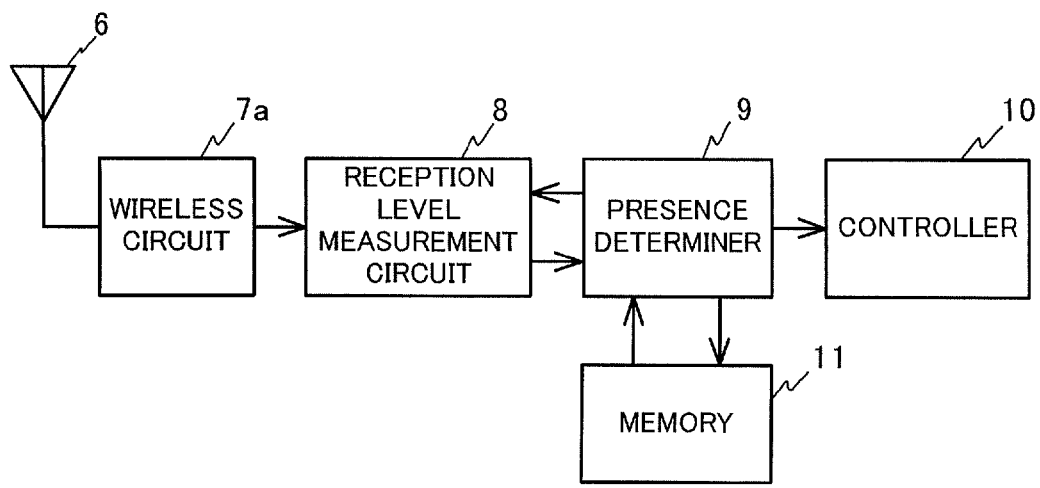
FIG. 2 is a block drawing showing the composition of the receiver of FIG.

FIG. 2 shows the composition of the receiver 2a. The receiver 2a comprises an antenna 6, a wireless circuit 7a, a reception level measurement circuit 8, a presence determiner 9, a controller 10 and a memory 11.

The antenna 6 receives the multipath wireless signals transmitted from the transmitter 1a. The antenna 6 is for example an antenna with small directionality such as a dipole antenna in order to facilitate reception of the multipath wireless signals. The wireless signals received by the antenna 6 are input into the wireless circuit 7a.

The wireless circuit 7a comprises for example a filter for band-limiting the wireless signals, a LNP (Low Noise Amp.) for amplifying the wireless signal, and a mixer for converting the wireless signals at the IF (Intermediate Frequency) stage, and/or the like. Output from the wireless circuit 7a is input into the reception level measurement circuit 8.

The reception level measurement circuit 8 measures the reception level of the wireless signals based on the output of the wireless circuit 7a. The reception level measured by the reception level measurement circuit 8 is output into the presence determiner 9.

The presence determiner 9 functions as a first determiner and a second determiner. The presence determiner 9 determines whether or not there has been a change in the presence/absence state of the person 5 based on the reception level of the wireless signals received intermittently at the beginning of a first interval (presence detection interval T1). In addition, the presence determiner 9 determines the presence/absence of the person 5 based on the variance of the reception level of the wireless signals received at the beginning of a presence detection interval T2 as a second interval shorter than the presence detection interval T1, when it is determined that the reception level of the wireless signals has changed.

The controller 10 controls the receiver 2a as a whole. The controller 10 controls the timing with which the wireless circuit 7a and the reception level measurement circuit 8 operate. That is to say, the controller 10 switches the timing with which the wireless circuit 7a and the reception level measurement circuit 8 operate between the first reception interval and the second reception interval based on the determination results of the presence determiner 9. The memory 11 stores data used in determinations by the presence determiner 9 or determination results and the like.

The presence determiner 9 and the controller 10 are for example microcomputers, and each of the functions is realized by each CPU executing programs stored in memory. The memory 11 comprises flash memory or RAM (Random Access Memory), for example.

Next, operation of the presence detection system 100 according to Embodiment 1 is described.

Upon beginning operation, the transmitter 1a periodically transmits beacon signals. For example, when the transmitter 1a is a wireless LAN base station, in general beacon signals are transmitted at the beginning of an interval of around 100 ms.

The beacon signals transmitted from the transmitter 1a reach at the receiver 2a via the propagation paths 3a, 3b, 3c, 3d and so forth. When the person 5 is not in the presence detection area 4, there is no fluctuation in the propagation paths and the reception level at the receiver 2a is stable and virtually a constant value. When there is a person 5 in the presence detection area 4, some of the propagation paths 3a, 3b, 3c, 3d and so forth are blocked, or are reflected, by the person 5, so the reception level at the receiver 2a becomes less or overly greater, or fluctuates in conjunction with a movement of the person 5.

Parameters related to operation of the receiver 2a are present in the receiver 2a. The settings of the receiver 2a are explained with reference to FIG. 2. In the memory 11 of the receiver 2a, an upper limit value and a lower limit value of the fluctuation range of the reception level when no person is present are set based on the reception level of the beacon signals transmitted from the transmitter 1a. The difference between the upper limit value and the lower limit value depends on the environment in which the presence detection system 100 is placed, but is a value around 5 dB to 10 dB.

The median value of the reception level when no person is present is regulated using measurement results when a determination of absence is made in the receiver 2a. For example, the controller 10 sets the average value of the reception level of the wireless signals when no person is present a recent predetermined number of times as the median value of the reception level. It is possible for the upper limit value and lower limit value to be also updated based on measurement results when it is determined that no person is present.

In addition, the presence detection interval T1 is set in the memory 11 of the receiver 2a in conjunction with the device accomplishing control. For example, the presence detection interval T1 is set to an interval of several minutes in an application with low urgency such as halting operation of home appliances such as an air conditioner during times of absence.

Operation of the receiver 2a differs between cases when presence is determined and cases when absence is determined as the previous presence detection result in the receiver 2a. First, operation when the previous presence detection result is determined to be absent is explained with reference to FIG. 3 and FIG. 4.

Figure 3:
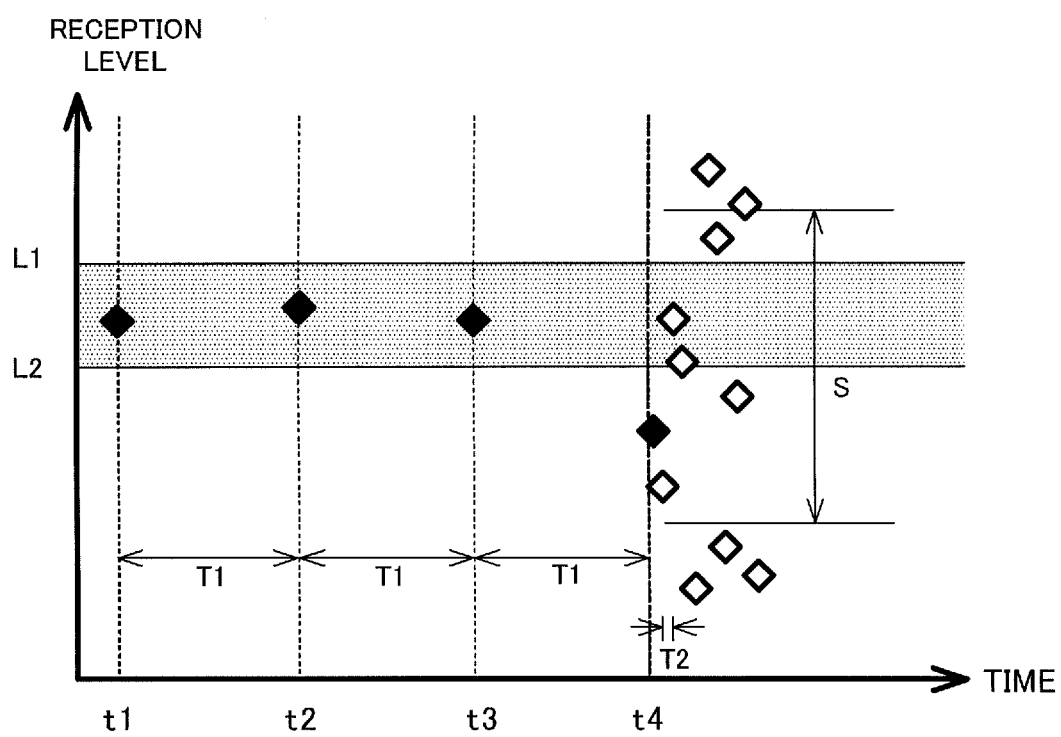
FIG. 3 is a graph showing reception levels.
Figure 4:
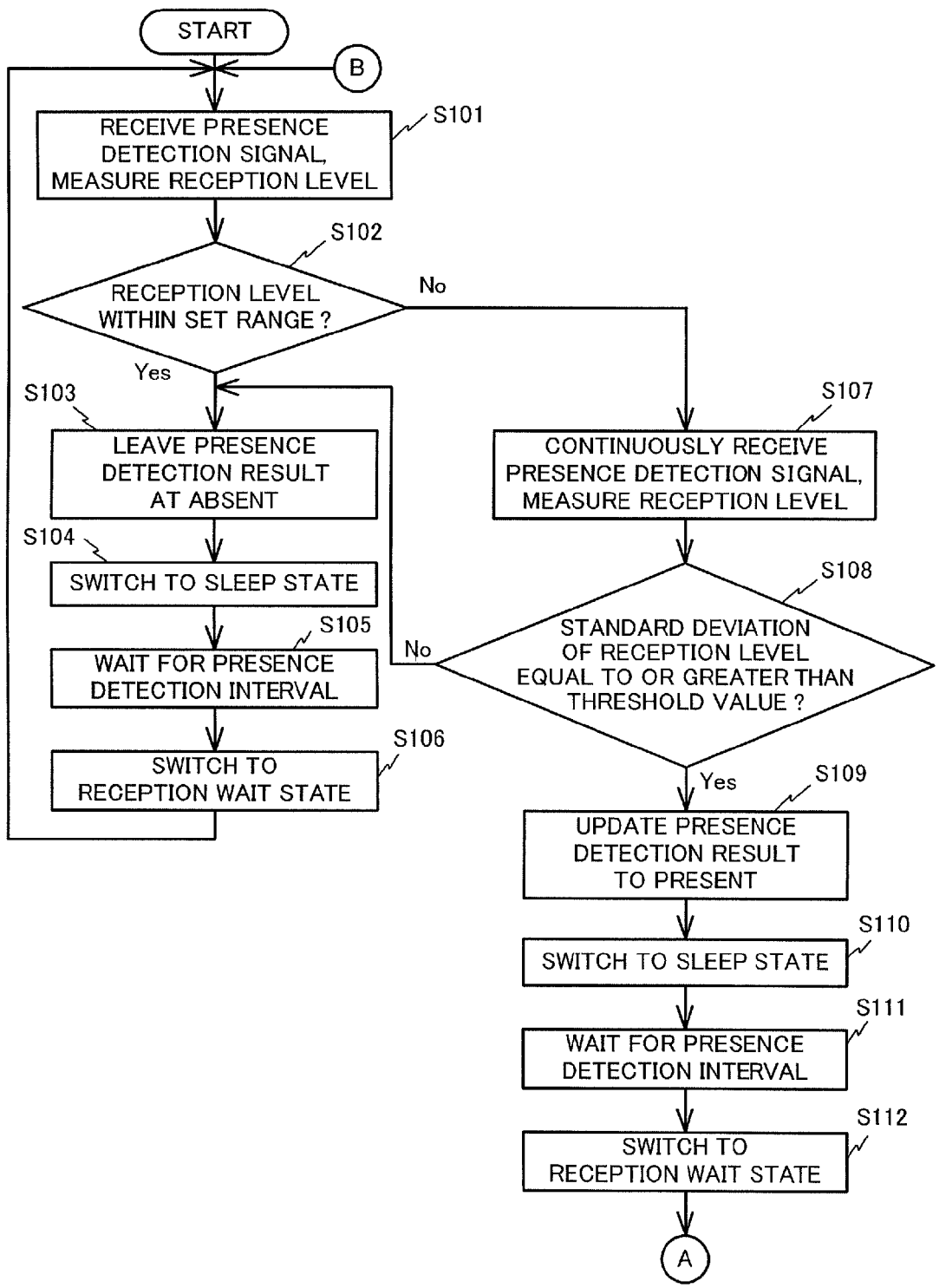
FIG. 4 is a flowchart (part 1) showing the operation of the receiver of FIG. 1.

In FIG. 3, an example of the measurement result of the reception level determined in the presence determiner 9 is shown for the case when the previous presence detection result is determined to be absent. FIG. 4 shows a flowchart of the process when the previous presence detection result in the receiver 2a is determined to be absent.

As shown in FIG. 4, the reception level measurement circuit 8 receives presence detection signals transmitted by the transmitter 1a once and measures the reception level (step S101). The presence detection signals received by the antenna 6 are input into the reception level measurement circuit 8 via the wireless circuit 7a. In the reception level measurement circuit 8, the reception level of the beacon signals received is measured. The measured reception level is input into the presence determiner 9.

Next, the presence determiner 9 determines whether or not the reception level of the presence detection signals received is not greater than the upper limit value L1 and not less than the lower limit value L2 of the fluctuation range of the reception level when no person is present, that is to say is contained within a set range (step S102).

When it is determined that the reception level of the presence detection signals received by the presence determiner 9 is not greater than the upper limit value L1 and not less than the lower limit value L2, that is to say is contained within the set range (step S102: Yes), the controller 10 leaves the presence detection result as absent and does not update the presence detection result (step S103). This process is accomplished if the reception level is that of times t1, t2 and t3 in FIG. 3.

Next, the controller 10 causes the receiver 2a to switch to a sleep state (step S104). In this sleep state, the controller 10 turns off the power source of the wireless circuit 7a and the reception level measurement circuit 8. In addition, the controller 10 sets the presence determiner 9 and operating mode of its own for example to the low-power-consumption mode of the microcomputer.

Next, the controller 10 causes a timer (unrepresented) to operate in the sleep state and waits while a set presence detection interval T1 passes (step S105).

When the presence detection interval T1 has passed, the controller 10 causes the receiver 2a as a whole to switch to a reception wait state (step S106) and returns to step S101.

On the other hand, when the reception level of the presence detection signals received is determined by the presence determiner 9 to be greater than the upper limit value L1 or less than the lower limit value L2, that is to say outside the set range (step S102: No), the controller 10 increase the reception frequency of the presence detection signals by the wireless circuit 7a and the reception level measurement circuit 8 for a fixed time (that is to say, sets the reception interval the second presence detection interval T2), continuously receives the presence detection signals and measures the reception level (step S107). The presence detection interval T2 is an interval of several hundred milliseconds to several seconds, and is an interval sufficiently short in relation to the presence detection interval T1.

Next, the presence determiner 9 calculates the standard deviation S of the continuously received presence detection signals after increasing the reception frequency, and determines whether or not the calculated standard deviation S of the measurement results is equal to or greater than a threshold value for determining the presence of a person (step S108). When the standard deviation S is less than the threshold value (step S108: No), the presence determiner 9 leaves the presence detection result of the receiver 2a as absent and does not update the presence detection result (step S103).

On the other hand, when the calculated standard deviation S is equal to or greater than the threshold value (step S108: Yes), the presence determiner 9 updates the presence detection result of the receiver 2a to present (step S109). Here, the controller 10 as necessary notifies equipment being controlled of the presence of a person.

Following this, the controller 10 causes the receiver 2a to switch to a sleep state (step S110) and waits for the set presence detection interval T1 to pass (step S111), and when the presence detection interval T1 has passed, causes the receiver 2a as a whole to switch to a reception wait state (step S112). After this step S112 is concluded, the process advances to step S201 in FIG. 5.

Figure 5:
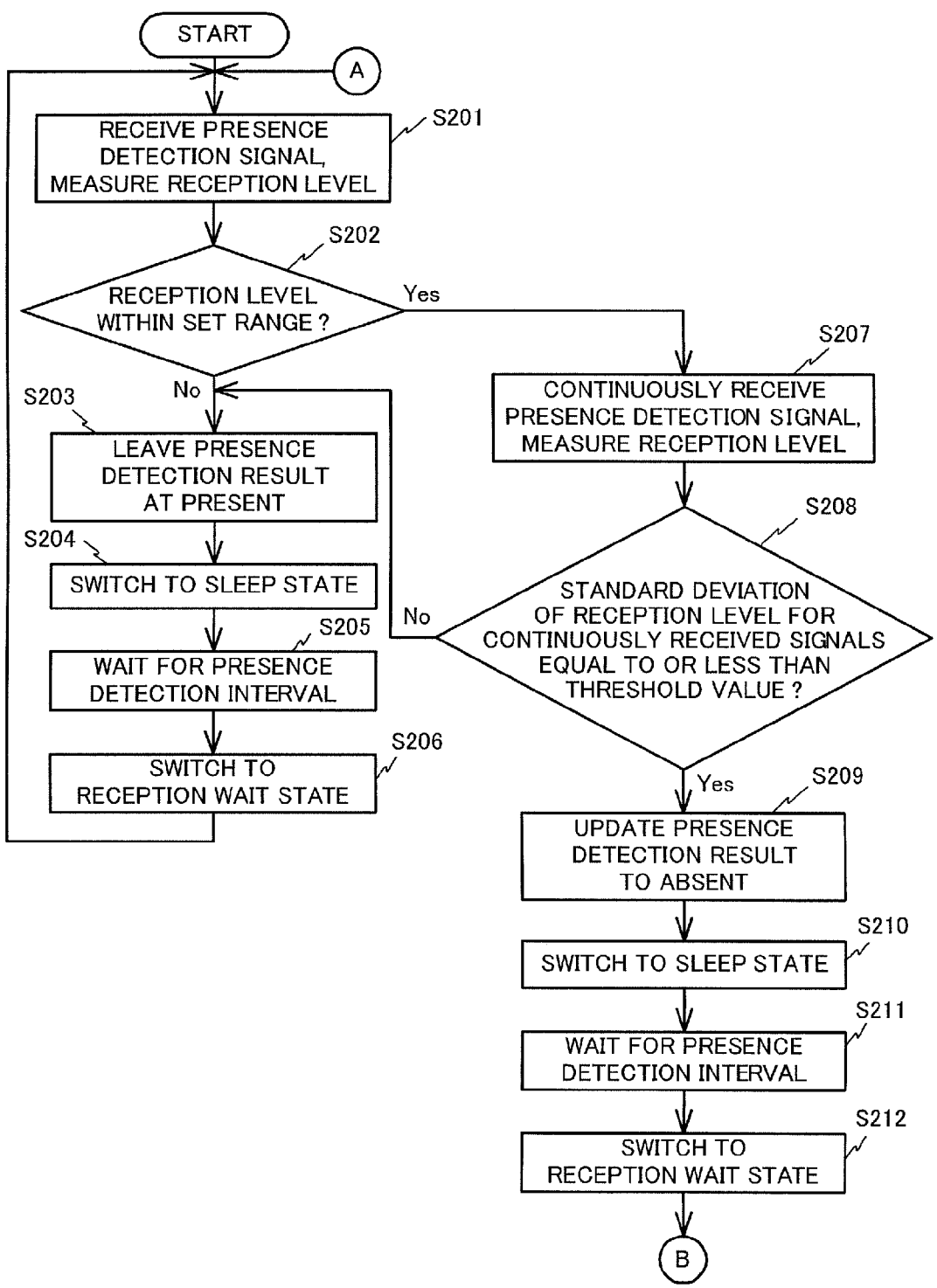
FIG. 5 is a flowchart (part 2) showing the operation of the receiver of FIG. 1.

Next, the operation when the previous presence detection result in the receiver 2a is that presence was detected is explained with reference to the flowchart in FIG. 5.

The receiver 2a receives the presence detection signals transmitted from the transmitter 1a and measures the reception level (step S201). At this time, it would also be fine to accomplish a process of receiving multiple presence detection signals and averaging such.

Next, the presence determiner 9 determines whether or not the reception level of the presence detection signals received is within the set fluctuation range for the reception level when no person is present, that is to say is not greater than the upper limit value L1 and not less than the lower limit value L2 (step S202).

When the presence determiner 9 has determined that the reception level of the presence detection signal received is not within the set range (step S202: No), the presence detection result of the receiver 2a is left as present and the presence detection result is not updated (step S203).

Next, the controller 10 causes the receiver 2a as a whole to switch to a sleep state (step S204).

Next, the controller 10 causes a timer to operate and causes the receiver 2a as a whole to wait for a time corresponding to the set presence detection interval T1 (step S205).

When the presence detection interval T1 has passed, the controller 10 causes the receiver 2a to switch to a reception wait state (step S206). Following this, the receiver 2a returns to step S201.

On the other hand, when the presence determiner 9 has determined that the reception level is within the set range (step S202: Yes), the controller 10 increases the reception frequency of the presence detection signals by the wireless circuit 7a and the reception level measurement circuit 8 for a fixed time (that is to say, sets the reception interval as the presence detection interval T2), causes the presence detection signals to be continuously received and causes the reception level to be measured by the reception level measurement circuit 8 (step S207).

Next, the presence determiner 9 calculates the standard deviation S of the continuously received presence detection signals after increasing the reception frequency, and determines whether or not the calculated standard deviation S of the measurement results is equal to or less than a threshold value for determining the presence of a person (step S208).

When the standard deviation S is greater than the threshold value (step S208: No), the presence determiner 9 leaves the presence detection result of the receiver 2a as absent and does not update the presence detection result (step S203).

On the other hand, when the calculated standard deviation S is no greater than the threshold value (step S208: Yes), the presence determiner 9 updates the presence detection result of the receiver 2a to absent (step S209). Here, the controller 10 as necessary notifies equipment being controlled of the absence of the person.

Following this, the controller 10 causes the receiver 2a to switch to a sleep state (step S210) and waits for the set presence detection interval T1 to pass (step S211), and when the presence detection interval T1 has passed, causes the receiver 2a as a whole to switch to a reception wait state (step S212). After this step S212 is concluded, the process returns to step S101 in FIG. 4.

As described in detail above, with this embodiment, in the receiver 2a the multipath presence detection signals are received at the beginning of a presence detection interval T1 that is a long interval and only when it is detected that there has been a change in the reception level thereof is continuous reception of the presence detection signals accomplished by shortening the interval for receiving the presence detection signals to T2. Through this, the necessity of constantly receiving the presence detection signals disappears, so it is possible to detect the presence of a person easily and over a broad range while reducing power consumption.

Furthermore, with this embodiment, it is possible to construct the presence detection system 100 easily and at low cost without using equipment exclusively for presence detection in the transmitter 1a.

In addition, with this embodiment, it is possible to control home appliance equipment based on presence detection results using the presence detection system, thereby increasing user convenience.

Embodiment 2

Next, Embodiment 2 of the present invention is described.

In Embodiment 1, presence detection signals used beacon signals transmitted from the transmitter 1a. In contrast, in Embodiment 2, a remote control and sensor equipment are used in the transmitter 1a. More specifically, the presence detection signals are transmitted from the base unit of sensor equipment that accomplishes wireless communication with a remote control and sensor equipment, and home appliance equipment operated by remote control.

Figure 6:
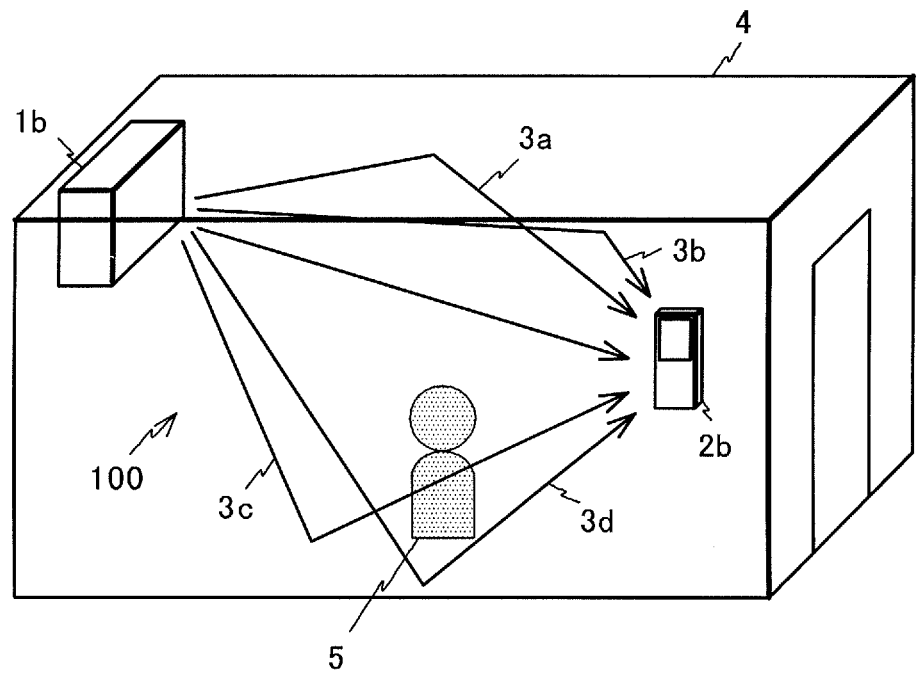
FIG. 6 is a schematic drawing showing a summary composition of a presence detection system according to Embodiment 2 of the present invention.

FIG. 6 shows the composition of the presence detection system 100 according to Embodiment 2. A transmitter 1b is a base station of sensor equipment that accomplishes wireless communication with a remote control and a controller, and home appliance equipment operated by a remote control. The composition other than this is the same as in the above-described Embodiment 1.

Figure 7:
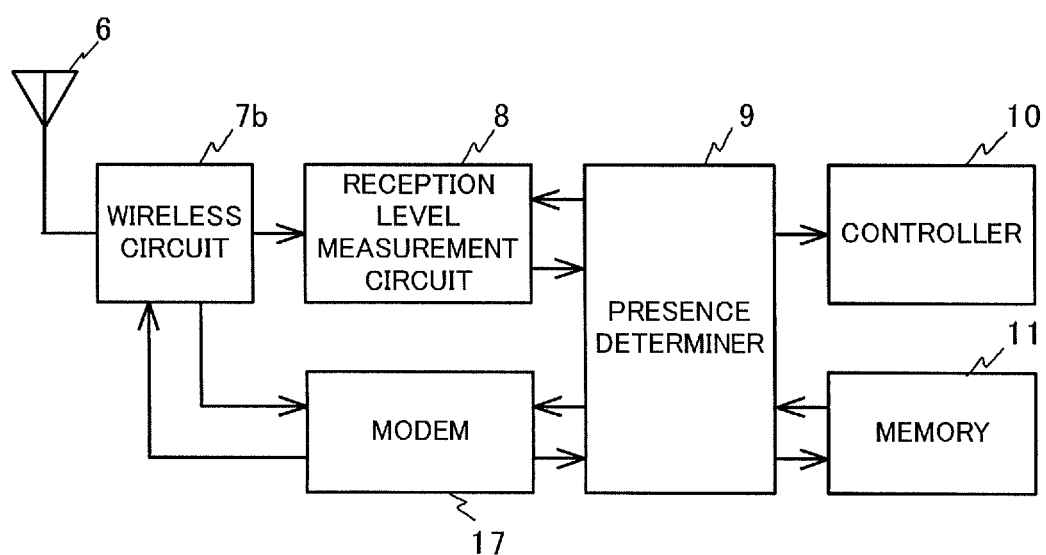
FIG. 7 is a block drawing showing the composition of the receiver of FIG. 6.

Next, the composition of a receiver 2b according to Embodiment 2 is described with reference to FIG. 7. The receiver 2b comprises an antenna 6, a wireless circuit 7b, a reception level measurement circuit 8, a presence determiner 9, a controller 10, a memory 11 and a modem 17.

The wireless circuit 7 is connected to the reception level measurement circuit 8 and the modem 17. The modem 17 is provided with a function for accomplishing modulation and demodulation of communication signals. The wireless circuit 7b is provided with a receiving circuit and a transmission circuit comprising a PA (Power Amp.) and/or the like. The composition other than this is the same as in the above-described Embodiment 1.

Next, the operation of the presence detection system according to Embodiment 2 is described.

When operation is started, the transmitter 1b waits for access from the receiver 2b. When operation is started, the receiver 2b transmits an acquisition request for presence detection intervals T1 and T2 and the next presence detection signal transmission time to the transmitter 1b from the presence determiner 9. The transmitted request is modulated by the modem 17 and is wirelessly transmitted via the wireless circuit 7b and the antenna 6.

The wirelessly transmitted request is received by the transmitter 1b. In response to this, the transmitter 1b transmits to the receiver 2b the presence detection interval T1 and the next presence detection signal transmission time. Data transmitted from the transmitter 1b is input into the presence determiner 9 via the antenna 6, the wireless circuit 7b and the modem 17 of the receiver 2b. The presence determiner 9 writes the presence detection interval T1 in the memory 11 and causes the receiver 2b to switch to a sleep state until the next presence detection signal transmission time, under timer control.

When the presence detection signal transmission time arrives, the receiver 2b switches to a reception wait state and receives the presence detection signals transmitted from the transmitter 1b. In order for the receiver 2b to receive the presence detection signals with certainty, it is necessary for the transmitter 1b and the receiver 2b to have accurate clocks. In general, in ceramic oscillators primarily used as clocks in home appliances, clock precision is on the order of 0.1%. This means an error of 60 msec during a one-minute time interval. Accordingly, it is necessary to lengthen the reception wait time for the presence detection signals on the receiver 2b side in accordance with the clock error. In addition, it is possible to reduce accumulation of errors by correcting clock errors through reception timing of the presence detection signals.

In the receiver 2b, the presence detection signals received by the antenna 6 are input into the reception level measurement circuit 8 via the wireless circuit 7a. In the reception level measurement circuit 8, the reception level of the presence detection signals transmitted by the transmitter 1b is measured and is input into the presence determiner 9. At this time, it would be fine to accomplish a process that receives the presence detection signals multiple times and averages such.

The reception level input into the presence determiner 9 is compared to an upper limit value and a lower limit value of a fluctuation range for the reception level when no person is present. The upper limit value and the lower limit value of the fluctuation range for the reception level are preset and adjusted in the receiver 2b the same as in the above-described Embodiment 1.

When the previous presence detection result in the receiver 2b was absent, when the reception level is greater than the upper limit value or less than the lower limit value, the presence determiner 9 of the receiver 2b transmits a continuous transmission request for the presence detection signals to the transmitter 1b.

In addition, when the previous presence detection result in the receiver 2b was present, when the reception level is not greater than the upper limit value and not less than the lower limit value, the presence determiner 9 of the receiver 2b transmits a continuous transmission request for the presence detection signals to the transmitter 1b.

The transmitter 1b that received the continuous transmission request for the presence detection signals continuously transmits the presence detection signals. Operation other than this is the same as in the above-described Embodiment 1.

As described in detail above, with this embodiment, the multipath wireless signal is received with a presence detection interval T1 having a long interval, and only when it is detected that the reception level thereof has changed, is continuous reception of the presence detection signals accomplished by shortening the interval for receiving the wireless signal to T2. Through this, the necessity of constantly receiving presence detection signals disappears, so it is possible to detect the presence of a person easily and over a broad range while reducing power consumption.

Furthermore, in the transmitter 1b, it is possible to reduce power consumption of the transmitter 1b by transmitting presence detection signals with low frequency and increasing the frequency for transmitting presence detection signals only when there is a request from the receiver 2b.

Using the presence detection system, it is possible to control home appliance equipment based on presence detection information, thereby increasing user convenience.

In the above-described Embodiments 1 and 2, the determination of whether the measurement result of the reception level is not greater than the upper limit value L1 and not less than the lower limit value L2 of the fluctuation range of the reception level when no person is present, or is greater than the upper limit value L1 or less than the lower limit value L2, was accomplished by receiving the presence detection signals once, but it would be fine to make the determination based on results after receiving the presence detection signals multiple times. In this case, for example, it would be fine to make the determination using multiple decisions of multiple received results, and it would also be fine to make the determination using an average value. Through this, it is possible to further increase the reliability of the determination.

In addition, with the above-described Embodiments 1 and 2, the upper limit value L1 and the lower limit value L2 of the fluctuation range of the reception level when no person is present were taken to be the absolute values of the reception level, but it would be fine to receive the presence detection signals multiple times and use the standard deviation as a threshold value. Through this, it is possible to further increase the reliability of the determination.

In the above-described embodiments, it would be fine to comprise the system by storing and distributing a program to be executed on a computer-readable recording medium such as a flexible disk, a CD-ROM (Compact Disc Read-Only Memory), a DVD (Digital Versatile Disc), an MO (Magneto-Optical Disc) and/or the like, and to execute the above-described thread by installing that program.

In addition, it would also be fine for the program to be stored on a disk device and/or the like possessed by a prescribed server device on a communication network such as the Internet and/or the like, and for example for the program to be overlaid on carrier waves and downloaded.

In addition, when the above-described functions are realized by an OS (Operating System) or through cooperation between an OS and applications, it would be fine for only the portion other than the OS to be stored and distributed via a medium, and to be downloaded.

Having described and illustrated the principles of this application by reference to one or more preferred embodiments, it should be apparent that the preferred embodiments may be modified in arrangement and detail without departing from the principles disclosed herein and that it is intended that the application be construed as including all such modifications and variations insofar as they come within the spirit and scope of the subject matter disclosed herein.

INDUSTRIAL APPLICABILITY

The present invention is suitable for detecting whether or not a person is present within a prescribed space.

REFERENCE SIGNS LIST 1a, 1b Transmitter
2a, 2b Receiver
3a, 3b, 3c, 3d Propagation path
4 Presence detection area
5 Person
6 Antenna
7a, 7b Wireless circuit
8 Reception level measurement circuit
9 Presence determiner
10 Controller
11 Memory
17 Modem
100 Presence detection system

The invention claimed is:

1. A presence detection system comprising a transmitter that periodically transmits wireless signals with a constant transmission power and a receiver that receives the transmitted wireless signals;
   wherein the receiver comprises:
   a first determiner that determines whether or not there has been a change in the reception level of the wireless signals received at the beginning of a first interval; and
   a second determiner that determines the presence/absence of a person on the basis of the reception level of the wireless signals received multiple times at the beginning of a second interval shorter than the first interval, when it is determined by the first determiner that the reception level of the wireless signals has changed.

2. The presence detection system according to claim 1, wherein the first determiner determines whether or not data relating to the reception level of the wireless signals is contained within a range from a predetermined lower limit value to a predetermined upper limit value of the reception level when no person is present, and determines whether or not there has been a change in the reception level based on the determined result.

3. The presence detection system according to claim 2, further comprising an adjuster that adjusts the lower limit value or the upper limit value, on the basis of reception levels of wireless signals measured in the past.

4. The presence detection system according to claim 2, wherein the first determiner determines whether or not the average value of the reception levels of wireless signals received multiple times is contained within the range from the lower limit value to the upper limit value and determines whether or not there has been a change in the reception level based on the determined result.

5. The presence detection system according to claim 2, wherein the first determiner compares, of the reception levels of wireless signals received multiple times, the number of instances contained within the range from the lower limit value to the upper limit value with the number of instances not contained within the range from the lower limit value to the upper limit value, and determines whether or not there has been a change in the reception level based on the result of the comparison.

6. The presence detection system according to claim 1, wherein the second determiner compares the standard deviation of the reception levels of the wireless signals received multiple times with a threshold value, and determines the present/absent state of a person based on the result of the comparison.

7. The presence detection system according to claim 6, further comprising an adjuster that adjusts the threshold value on the basis of the reception levels of wireless signals measured in the past.

8. A presence detection method that uses a system comprising a transmitter for periodically transmitting wireless signals with a constant transmission power and a receiver for receiving the transmitted wireless signals, this method comprising:
  a first determination procedure for determining whether or not there has been a change in the reception level of the wireless signals received at the beginning of a first interval by the receiver; and
  a second determination procedure for determining the presence/absence of a person on the basis of the reception level of the wireless signals received multiple times at the beginning of a second interval shorter than the first interval by the receiver, when it is determined in the first determination procedure that the reception level of the wireless signals has changed.

9. A non-transitory computer-readable recording medium having stored thereof a program for causing a computer that controls a receiver for receiving wireless signals that is periodically transmitted with a constant transmission power to function as:
  a first determiner for determining whether or not there has been a change in the reception level of the wireless signals received at the beginning of a first interval by the receiver; and
  a second determiner for determining the presence/absence of a person on the basis of in the reception level of the wireless signals received multiple times at the beginning of a second interval shorter than the first interval by the receiver, when it is determined by the first determiner that the reception level of the wireless signals has changed.

10. The presence detection system according to claim 1, wherein the transmitting wireless signals are radio waves with a frequency lower than that of microwaves.

11. The presence detection method according to claim 8, wherein the transmitting wireless signals are radio waves with a frequency lower than that of microwaves.

12. The non-transitory computer-readable recording medium according to claim 9, wherein the transmitting wireless signals are radio waves with a frequency lower than that of microwaves.

* * * * *